(12) United States Patent
Warner et al.

(10) Patent No.: US 7,515,691 B2
(45) Date of Patent: Apr. 7, 2009

(54) METHOD FOR TESTING DSL CAPABILITY OF TELEPHONE LINES

(75) Inventors: Roderick Warner, Mapledurwell (GB); Muhammad A. Afzal, Elk Grove Villa, IL (US); Frank R. Bauer, Long Grove, IL (US); Joseph S. Rosen, Chicago, IL (US)

(73) Assignee: Tollgrade Communications, Inc., Wilmington, DE (US)

( * ) Notice: Subject to any disclaimer, the term of this patent is extended or adjusted under 35 U.S.C. 154(b) by 862 days.

(21) Appl. No.: 10/956,816

(22) Filed: Oct. 1, 2004

(65) Prior Publication Data

US 2007/0230667 A1    Oct. 4, 2007

(51) Int. Cl.
 H04M 1/24  (2006.01)
 H04M 3/08  (2006.01)
 H04M 3/22  (2006.01)
(52) U.S. Cl. .............................. 379/1.04; 379/9; 379/12; 379/15.03; 379/22.02; 379/24
(58) Field of Classification Search ................ 379/1.01, 379/1.03, 1.04, 9, 9.02, 9.06, 10.01, 12, 15.01, 379/15.03, 22.05, 24, 27.01, 29.01, 22.02; 370/241, 241.1, 242, 244, 247, 248, 250, 370/252
See application file for complete search history.

(56) References Cited

U.S. PATENT DOCUMENTS 6,389,109 B1    5/2002  Schmidt et al.
6,477,238 B1    11/2002 Schneider et al.
7,027,405 B1 *  4/2006  Khadavi ..................... 370/244
2002/0048348 A1 * 4/2002 Jin et al. .................. 379/29.01
2004/0066913 A1 * 4/2004 Kennedy et al. ............. 379/22
2004/0086085 A1  5/2004  Nordling et al.
2004/0114527 A1  6/2004  Faulkner et al.

OTHER PUBLICATIONS

Hedlund, et al: "DSL Loop Test", Telephony, Chicago, IL, US., vol. 235, No. 8, Aug. 24, 1998.

* cited by examiner

Primary Examiner—Binh K Tieu
(74) Attorney, Agent, or Firm—The Webb Law Firm

(57) ABSTRACT

A system and method for performing DSL assessments of a telephone line along a prescribed test path is disclosed. The disclosed system includes a loop diagnostic test unit adapted for testing said telephone line using narrow-band and mid-band frequency test signals; a test system controller and a test system server to provide the DSL assessments to a user via an appropriate interface. In addition, the disclosed methods include the basic steps of: accessing the telephone line along the test path that includes selected hardware such as a voice switch test bus, central office splitter, service provider instruments and terminations; ascertaining various line characteristics along the test path using mid-band and narrow-band frequency signals; analyzing the line characteristics to identify line conditions that affect DSL service; and determining the impact of the line conditions on DSL service.

37 Claims, 8 Drawing Sheets

A-Leg Ground Fault, Link Profile 1 (Unlimited)

METHOD FOR TESTING DSL CAPABILITY OF TELEPHONE LINES

CROSS REFERENCE TO RELATED APPLICATIONS (None)

STATEMENT REGARDING FEDERALLY SPONSORED RESEARCH (None)

SEQUENCE LISTING OR COMPUTER PROGRAM (None)

BACKGROUND

The present invention relates to a method for assessing DSL capability of telephone lines, and more particularly, a DSL test method that employs test signals in both narrow band frequency ranges and mid band frequency ranges along a selected test path of a telephone line to identify line characteristics and line conditions that could affect DSL service on the telephone line.

With the explosion in the growth of Internet usage among both businesses and households, telephone companies have been pressured to provide affordable, high bandwidth access that will support high-speed multimedia services, such as video on demand, high speed Internet access, and video conferencing. To meet this demand, telephone companies are increasingly turning to digital subscriber line (DSL) technology. As used herein, DSL is a generic term for a group of higher-rate digital subscriber line communication schemes capable of utilizing twisted pair wiring from an office or other terminal node of a telephone network to the subscriber premises. DSL has been further separated into several different categories of technologies according to specific expected data transfer rates, the types and lengths of the medium over which data are communicated, and schemes for encoding and decoding the communicated data. Examples under various stages of development include ADSL (Asymmetrical Digital Subscriber Line), HDSL (High data rate Digital Subscriber Line), SDSL (Symmetric Digital Subscriber Line), and VDSL (Very high data rate Digital Subscriber Line). DSL technology, while having several different embodiments, can provide throughput rates over 100 times faster than that available through traditional 56 Kb/s modems. As with most telecommunication products and services, DSL service providers need reliable, cost effective means of testing or qualifying the DSL capabilities of the basic telephone lines as well as providing periodic or on-demand assurance of DSL service to its subscribers.

One way of addressing the problem of DSL service assurance is for a service provider to leverage the capabilities of their existing testing infrastructure, such as the common Plain Old Telephony System (POTS) test hardware. As part of the POTS test environment, many service providers today use an automated loop test system (LTS), for analyzing reported troubles on subscribers' telephone lines. An LTS selectively connects to the central office terminals of twisted pair telephone wiring and conducts electrical tests on metallic circuits. Such a system can apply AC voltage across a wire pair, between the Tip (T) wire and ground, and between the Ring (R) wire and ground, and take appropriate measurements to determine characteristic impedances. The LTS can also measure the DC resistance between the wires and between each wire and ground. The LTS stores a list of DC and AC resistance/impedance values that correspond to certain line conditions, e.g. shorts, opens, normal telephone set connections, etc. The LTS makes decisions as to the presence or absence of different types of faults by comparing the test result values to its stored list of fault threshold values.

However, LTS tests provide limited information regarding the transfer characteristic of the loop or telephone line, particularly with respect to the frequency ranges affecting DSL services. Deployed line test systems cannot accurately determine if a line is 'Test OK' for DSL service and can give erroneous test results based on voice band measurements and POTS dispatch and fault analysis. These erroneous test results include incorrectly stating 'Test OK' when loop or telephone line is faulty or inadequate for DSL service, and incorrectly identifying loop failures associated with voice band that do not impair DSL service.

Another common approach for DSL qualifications or service assurance is for a service provider to use their network management infrastructure to access status information about each subscriber's DSL service from the DSLAM. A DSLAM typically makes available the following information about the status of each subscriber's data connection (ATU-C and ATU-R): serial number, version number, current signal-to-noise margin, current attenuation, current operating status (including loss of framing, loss of power, loss of signal quality), current output power, current attainable rate, current transmit rate, current receive rate.

Unfortunately, the DSLAM does not support direct measurements of the switching fabric, central office splitter, the central office wiring, the outside plant wiring, and premises wiring. Thus, while the DSLAM information can indicate that a service is unavailable or impaired it cannot perform necessary analysis to determine root cause of a fault, type of fault, or location of a fault, except where the fault is within the DSLAM itself.

Yet another approach is to introduce a DSL test unit into the path between the ATU-C and ATU-R using a Test Access Matrix (TAM) just beyond the CO splitter. The TAM provides a test path that circumvents the splitter allowing high frequency based measurements to be performed on the line. These measurements provide a direct indication of ingress noise and other line failure modes. In addition to the additional test hardware required, a critical limitation to this approach is that establishing a test path through the high frequency measurement unit disrupts the subscriber's DSL service for the duration of testing, which could last anywhere from thirty seconds to over three minutes or more.

The presently disclosed DSL test system and methods overcome one or more of the problems identified above.

BRIEF SUMMARY OF THE INVENTION

In one aspect, the present invention may be characterized as a method for performing a DSL assessment of a telephone line along a prescribed test path, the method comprising the basic steps of (1) accessing the telephone line along the test path that includes selected hardware such as a voice switch test bus; (2) ascertaining various line characteristics along the test path using mid-band and narrow-band frequency signals; (3) analyzing the line characteristics to identify line conditions that affect DSL service; and (4) determining the impact of the line conditions on DSL service.

In a somewhat broader sense, the invention may also be characterized as a method for performing a DSL test of a telephone line along a prescribed test path. The DSL test method comprises the steps of: (1) accessing a telephone line along a test path, said test path being a single ended test path; (2) ascertaining various line characteristics along said test path using mid-band and narrow-band frequency signals; and (3) analyzing the line characteristics to identify line conditions which affect DSL service. The preferred line conditions include imbalance conditions such as resistive imbalance and capacitive imbalance.

These and other features, aspects and advantages of the present invention will become more apparent from consideration of the detailed description and drawings set forth below.

BRIEF DESCRIPTION OF THE DRAWINGS

The above and other aspects, features and advantages of the present invention will be more apparent from the following more particular description thereof, presented in conjunction with the following drawings wherein.

DETAILED DESCRIPTION

The following description includes the best mode presently contemplated for carrying out the invention. This description is not to be taken in a limiting sense but is made merely for the purpose of describing the general principals of the invention. The scope and breadth of the invention should be determined with reference to the claims.

The written description uses a large number of acronyms to refer to various services and system components. For purposes of this description, selected acronyms therefore will be defined as follows:

DSL—Digital Subscriber Line

ADSL—Asymmetrical Digital Subscriber Line

HDSL—High data rate Digital Subscriber Line

VDSL—Very high data rate Digital Subscriber Line xDSL—Generic class of Digital Subscriber Line Services ATU-C—ADSL Terminal Unit-Central Office ATU-R—ADSL Terminal Unit-Remote RT—Remote Switching Unit CO—Central Office DSLAM—Digital Subscriber Lim Access Multiplexer TAM—Test Access Matrix MDF—Main Distribution Frame POTS—Plain Old Telephony Service LDU—Loop Diagnostic Unit NID—Network Interface Device OSS—Operations Support System TSC—Test System Controller IDS—Interface Data Server API—Application Program Interface GUI—Graphical user Interface SR—Series Resistance SOAP—Simple Object Access Protocol CORBA—Common Object Request Broker Architecture XML—External markup Language DSP—Digital Signal Processor ISDN—Integrated Services Digital Network TCP/IP—Transmission Control Protocol/Internet Protocol SNR—Signal to Noise Ratio DC—Direct Current AC—Alternating Current DSL Test System The system architecture of the preferred embodiment is built around three main platform components. These three platform components are preferably extensions of platform components typically used to implement a Plain Old Telephony System (POTS) Loop Test System such as Teradyne's 4TEL System.

Figure 1:
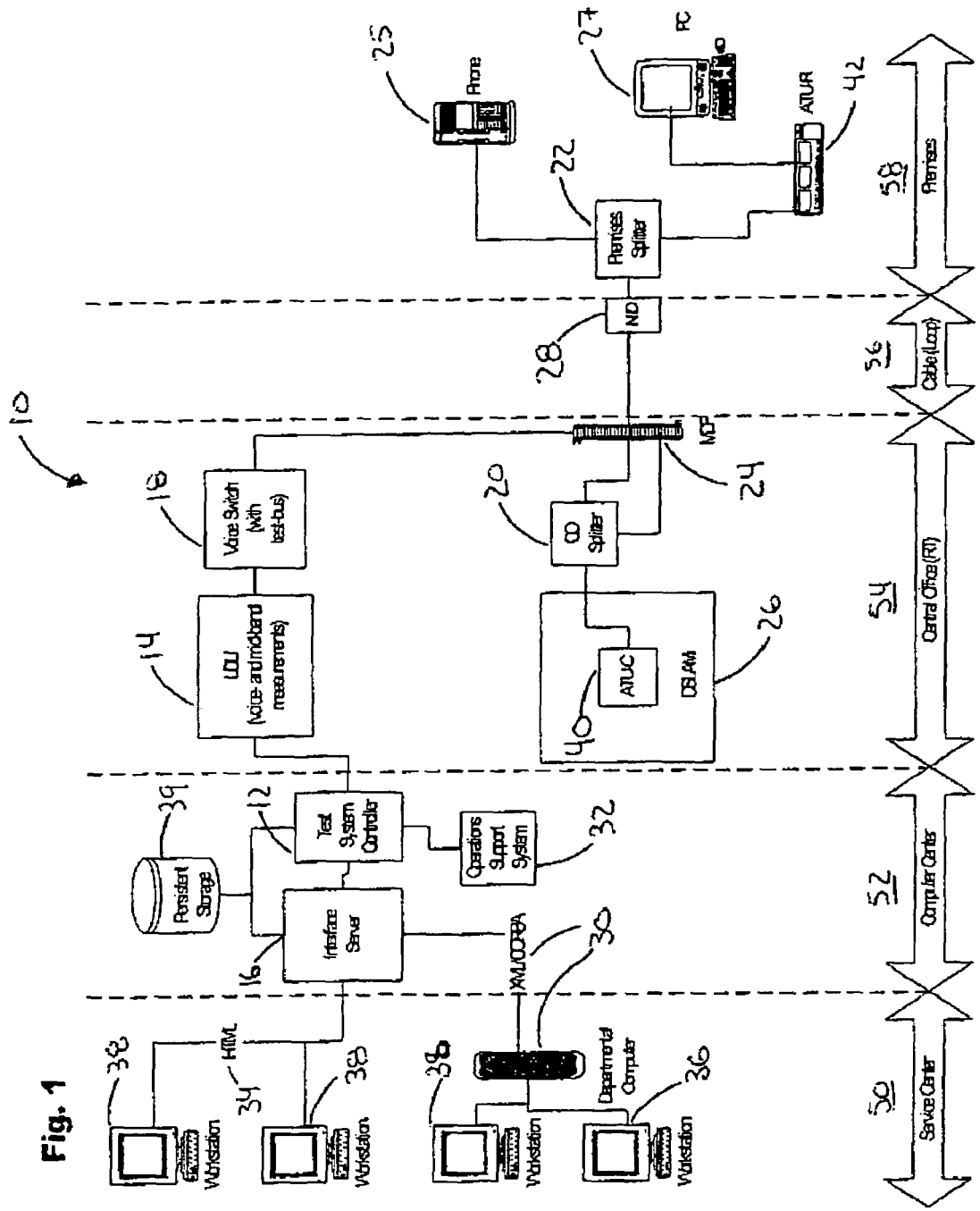
FIG. 1 is a schematic view of an embodiment of the present DSL Test System.

As illustrated in FIG. 1, the DSL Test System architecture 10 comprises a Test System Controller (TSC) 12, a Loop Diagnostic Unit (LDU) 14, and an Interface Data Server (IDS) 16. In the preferred embodiment, the TSC 12 is a central computing platform comprising a software and hardware element. The TSC 12 is adapted for commanding and controlling the test infrastructure, including the LDU 14 and IDS 16 as well as other peripheral test related equipment and systems. In addition, the TSC 12 performs comprehensive DSL analysis and diagnostics using the collected test data and readily available system information. The TSC 12 is also adapted to dispatch various reports, alarms, and other outputs, where appropriate.

In the preferred embodiment, the LDU 14 is a DSP-based test head that uses narrow-band and mid-band frequency signals to test a DSL. As used herein, narrow-band frequencies relates to voice band frequencies, typically less than 3.5 kHz. Mid-band frequencies typically include frequencies from the narrow-band range to about 20 kHz.

As further shown in FIG. 1, the LDU 14 typically resides or is installed in the Central Office, but alternatively can reside in a remote site such as the RT. The LDU 14 generates test signals, executes selected tests to prescribed lines, and collects parametric measurement data. Advantageously, the LDU 14 is adapted to execute the selected narrow-band and mid band frequency tests on prescribed lines that include at least one switch test bus 18 and one or more ASDL splitters 20, 22. More specifically, the LDU 14 can access a line having a signal path including the switch test bus 18, MDF 24 and DSLAM 26 cabling, the low-pass filter of an ADSL CO or RT splitter 20, outside premises cable and instrumentation, network interface device (NID) 28, subscriber premises wiring and other subscriber equipment such as a telephone 25, PC 27, or modem 29 located within the premises 58 or any combination thereof.

In short, the preferred embodiment uses the test path typically accessible to a POTS Loop Test System, but does so at mid-band frequencies, not applicable to voice band test measurements. As with many POTS Loop Test Systems, line measurements obtained through this test path are initiated at the service provider's central office or remote switching units and are single-ended. In other words, the DSL mid-band frequency tests do not require any active measurement technology on the subscriber end or other second location, thus keeping systems costs manageable. The LDU 14 is in operative communication with the TSC 12 such that the collected parametric measurement data is forwarded to the TSC 12 for analysis and fault identification.

The IDS 16 is also a computing platform comprising a hardware and software element. In particular, the IDS 16 provides one or more application programming interfaces (API) 30 for access by OSS 32, or other computers 36 machines and equipment of the service provider or its agents. The preferred embodiment of the Interface Data Server also includes a HTML-based Graphical User Interface 34 for access by various users and their workstations 38. As used herein a user may include one or more DSL subscribers, DSL service provider personnel, customer service representatives, or other persons or machines that have an identified need or desire for DSL test data. The IDS 16 typically resides would reside within the management network of the service provider so as to offer a source of persistence data storage 39 as well as secure access to the system from users and equipment within the service center 50. Alternatively, the IDS 16 may be a distributed computing platform accessible by users via a local or wide area network, or may be a centralized system at the site of one or more users. Like the LDU 14, the IDS 16 is in operative communication with the TSC 12 such that the analysis and fault identification as well as any configuration information or other data residing on the TSC 12 or its associated persistent storage 39 may be available to the users.

On an as-needed basis selected users of the system such as the subscriber, Tier 1 or Tier 2 personnel, or administrative users, are queried for specific and targeted information directly relevant to the contemplated analysis. This dialog or interchange-based component of the test and analysis method is constrained and mediated by the identified line conditions and selected performance models. This results in more efficient and focused interactions with users or other external sources of information. This user provided information could include such data elements as the vendor and type of ATU-C 40 and ATU-R equipment, the status of the ATU-R 42, the status of the voice-grade connection, the status of the DSL data service, and information about any other premises equipment.

Turning back to FIG. 1, the TSC 12 is disposed in a designated computer center 52 and forms the central element of the DSL testing system 10. The TSC 12 provides administration user interface, LDU interface, test management and control, expert system analysis, and operation support system (OSS) database interface.

Using industry standard hardware, such as a SUN Microsystems Central Processing Unit and UNIX Operating System, the TSC 12 provides all the centralized processing and control for the DSL test system 10. The TSC 12 includes a main processing unit or units, random access memory, persistent storage 39, input/output peripherals and a communications server sub-system. The TSC 12 manages the majority of the external interfaces included within the disclosed DSL test system 10.

The TSC 12 is preferably configured and associated with for a selected group of switches and associated LDUs. For service provider users (e.g. Tier 1 users, Tier 2 users, and administrative users), a gateway TSC will be configured with their account details and test system access privileges. This account applies for both testing on the gateway and other TSCs reachable from the gateway. The site data is fully configurable on line. For large geographical area coverage, multiple TSCs can be transparently networked together via Local Area Networks or wide Area networks thereby enabling the DSL test system to test millions of lines across a telephone network.

The LDU 14 is a DSP-based test head installed in the central office (CO) 54 or remote switching unit (RT) in order to conduct measurements of the designated cable or loop 56 in response to requests from the TSC 12. The TSC 12 makes such test requests to the LDU 14 in response to user requests for various tests or on a prescribed test schedule. The LDU 14 interfaces to both analog and digital switches of varying size, complexity, and location, including switching schemes deployed in smaller remote switching units as well as larger central offices. The LDU 14 forms an integral part of the test system 10, returning parametric line measurement data to the TSC 12. The parametric line measurement data is used to ascertain selected line characteristics which is subject to further analysis to obtain the desired DSL assessments, including line condition identification, fault identification, line impairment detection, and other assessments such as overall DSL qualification determinations as well as overall DSL service assurance determinations.

The LDU 14 uses a DSP, random access memory, and non-volatile storage to execute measurement algorithms for the testing of copper lines to deliver accurate, reliable test results. Communication between a TSC 12 and LDU 14 is preferably achieved via a modem, ISDN, X.25 or TCP/IP network connection, although other communication protocols can be used.

The preferred DSL test system uses a machine-to-machine interface to digital switches from the TSC 12. The TSC 12 performs the access request to the switch interface and then commands the LDU 14 to perform the actual measurements. Each LDU 14 is connected to a switch test bus 18 and employs the same specialized loop test techniques to perform metallic line measurements. DSP measurement circuits in the LDU 14 test the accessed line and the resulting parametric measurement data is returned to the TSC 12. To maintain accuracy, the LDU 14 automatically compensates for temperature and other changes during its working life by periodically re-calibrating itself.

The DSL test system provides a variety of options for integration into the service provider's environment through use of the IDS 16. This server supports an HTML-based interface 34 using a web server (Apache) or a server engine (Tomcat) so users can access the system from an Intranet or the Internet using a standard web browser.

The IDS 16 also offers standards-based APIs 30 such as SOAP and CORBA to allow access from the service provider's OSS. This enables the service provider to generate test requests and receive results via an API 30. The preferred DSL test system 10 automatically executes the requested test using the directory or equipment number of the customer line. Both Equipment Number and Directory Number access is supported.

During the test sequence, the IDS 16 provides progress messages that allow the operator to monitor the status of the test. With the test complete, the test system 10 provides the analyzed results to assist either the operator or the OSS 32 to determine the condition of the line, and the appropriate repair action.

Mid-Band Frequency Tests

Most POTS LTS test measurements are made at frequencies of 1 KHz and below. While the telephony signal path through the splitter has a frequency limit above that of normal telephony signals, typically up to about 20 KHz, it is much lower than the frequencies used to support xDSL communication. The information provided using these low-frequency measurements (e.g. 1 KHz) has restricted value with respect to identifying and evaluating line conditions that might affect xDSL service quality, and in particular ADSL service quality.

The frequencies at which ADSL operates which are between 38 KHz and 1.1 MHz. This frequency range within the telephony infrastructure is considered high or very high frequency range. For purposes of telephony infrastructure-based DSL testing, the frequency range between about 4 KHz and up to about 20 KHz is referred to as the mid-band frequency range.

The test path in most POTS measurement systems is frequency-limited by the CO splitter to a maximum of no more than about 20 KHz. This is below the frequencies at which ADSL operates which are between 38 KHz and 1.1 MHz. Further, it is well below the frequencies of any noise that might impact ADSL performance. For these reasons, it was historically thought that mid-band frequency measurements would be of little or no use in matters of xDSL service qualification and xDSL service assurance. However, the present DSL test system and associated analysis techniques overcomes this challenge.

In the preferred embodiment, the mid-band frequency tests are carried out at a plurality of bandwidths and frequency resolutions. Typical mid-band frequency tests range between 8 kHz and 20 kHz. The test frequency values are controllable through LDU test request parameters. The test path is probed under various drive conditions during the tests. The drive condition settings refer to different configurations for test signal application. The drive source excitation can be applied in common-mode or differential mode, and the common mode signal in turn could be with reference to tip, ring or both the legs of the cable pair. A single mid-band LDU test typically involves a combination of drive settings where the response of the line under test to the drive signal is inverted to obtain various line parameters used for subsequent line conditions analysis. In a preferred mid-band frequency test sequence, the specific mid-band frequency tests include: AC2: (common-mode) at 20 kHz; AC2: (differential-mode) at 20 kHz; and AC3: (Common/differential mode) at 9 kHz The AC2 and AC3 nomenclature refers to 2-terminal or 3-terminal mid-band measurements, respectively. The AC2 drive source is either in common or differential mode where the AC3 measurement implies a sequential combination of common mode and differential mode measurements. The 20 kHz tests are performed at multiple test frequency resolutions and drive conditions.

Narrow-band frequency testing includes POTS test measurements taken using applied voltages between −10V and −40V. Introducing these voltages may change the magnitude of fault conditions on the line under test. In some cases, for example, with oxidation-based resistance faults, application of these voltages may remove or diminish them. However, such faults may reappear some minutes or hours later and then continue to worsen. In some cases, the application of these voltages appears to make line balance faults worse. Thus line condition stability is itself an important condition to be developed and analyzed.

Most potentially unstable DSL service affecting line conditions can be identified through using mid-band frequency test measurements. However, the sequence in which the DSL tests are performed is potentially important. In general, low voltage, mid-band frequency measurements will be made first, followed by higher voltage, narrow-band frequency measurements, followed again by a second set of mid-band frequency measurements. The magnitude of the line characteristics (and associated line conditions) identified using the first set of mid-band frequency measurements are compared with those identified using the second set of mid-band frequency measurements.

DSL Test Path

The preferred embodiment of the DSL test system employs single ended test paths. Test measurements of selected telephone lines are typically initiated and the test results collected at the same location and using the same LTU. In practice, the LTU is located at the central office or remote switching unit. As a single-ended test system, the DSL tests do not require any active measurement technology on the subscriber end or other second location, thus keeping the deployment or installation costs of the disclosed DSL test system manageable and the overall DSL test system configuration relatively simple, as compared to multi-end DSL test systems.

Of equal importance is the fact that the present DSL test system and method takes appropriate test measurements on a test path that passes through the voice switch test bus associated with the telephone line under test. As such, the DSL tests and test path do not require or involve any Test Access Matrix (TAM) for access to the telephone line, making this approach an economical solution for mass-market consumer DSL service assurance testing. Further, the present DSL test system and methods are not disruptive of DSL service and therefore can be used to support a background testing capability that periodically monitors the health of a subscriber's DSL service.

As seen in FIG. 1, the test path for a DSL circuit generally extends from the CO splitter 22 or RT splitter to the premises 58. The cable length is a critical factor in determining what maximum DSL data rate a copper pair can support. Thus, cable length must be consistent and accurate to within 100 feet across multiple test measurements taken at different times. This includes situations where there are line terminations such as mechanical or electronic ringers, modems, fax machines, or other typical telephony compatible customer premises equipment and DSL service provider instrumentation.

Signaturized splitter detection is a DC signature analysis technique. Section E.2.1.7 Maintenance Test Signatures of the T1E1 standard G.992.1 ADSL Transceivers defines the requirements for splitter maintenance test signatures. The signatures are designed to be activated only by line test systems and not to interfere with normal circuit operation. Through analysis of raw DC test measurements, the DSL test system is capable of determining the presence of the CO splitter as well as its orientation in the test path, as well as other splitters disposed in the test path.

Figure 2:
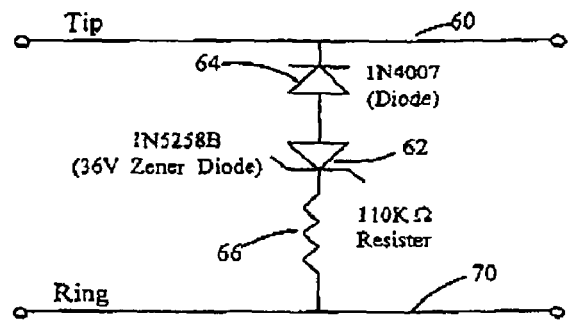
FIG. 2 is a diagram of a circuit within a signaturized splitter.

FIG. 2 details the CO splitter design specifications employed in the preferred embodiment of the DSL test system. By driving the circuit with forward and reverse bias, the diode breakdown voltage can be determined along with its orientation. This circuit includes the tip leg 60 and ring leg 70 of a cable pair; a 36V breakdown Zener diode 62 (e.g. IN5258B Diode); a common diode in opposite polarity 64 (e.g. IN4007 Diode) in series with an 110 kΩ resister 66. The test involves applying +48V (forward bias) and −48V (reverse bias) source voltages alternatively across the pair and measuring the Tip-Ring resistance. In the forward bias test the diode will prohibit the current flow, while Zener diode 60 will break down, while in the reverse bias test and the 110 kΩ resister 62 will be observed.

Ascertaining Line Characteristics

In the preferred embodiment, line characteristics are ascertained using line test systems such as the 4TEL II Line Test System from Teradyne, Inc. The preferred measurements include a plurality of resistance measurements, capacitance measurements, low frequency AC current measurements, DC current measurements, and voltage measurements. Safety considerations in test execution and performance require the application of very low current and voltages through the test path.

In particular, the preferred embodiment obtains a plurality of resistance measurements such as tip-ground ($\Omega_{tg}$), ring-ground ($\Omega_{rg}$), tip-battery ($\Omega_{tx}$), ring-battery ($\Omega_{rx}$), tip-ring ($\Omega_{tr}$), and ring-tip ($\Omega_{rt}$) as well as a plurality of capacitance measurements such as mutual ($C_{mut}$), cable ($C_{cab}$), tip-ground ($C_{tg}$), ring-ground ($C_{rg}$), tip-ring ($C_{tr}$), ring-tip ($C_{rt}$). The disclosed embodiment also includes both Alternating Current (AC) and Direct Current (DC) measurements. Specifically, the narrow-band frequency (e.g. 30 Hz) AC current measurements include tip-ground-conductance ($G_{tg}$), tip-ground-susceptance ($S_{tg}$), ring-ground-conductance ($G_{rg}$), ring-ground-susceptance ($S_{rg}$), tip-ring-conductance (Gtr), tip-ring-susceptance ($S_{tr}$), ring-tip-conductance ($G_{rt}$), ring-tip-susceptance ($S_{rt}$), tip-mutual-conductance ($G_{t\text{-}mut}$), tip-mutual-susceptance ($S_{t\text{-}mut}$), ring-mutual-conductance ($G_{r\text{-}mut}$), ring-mutual-susceptance ($S_{r\text{-}mut}$), tip-background-current ($I_{t\text{-}bkg}$), and ring-background-current ($I_{r\text{-}bkg}$) whereas the DC current measurements include tip-battery ($I_{dc\text{-}t\text{-}bat}$), ring-battery ($I_{dc\text{-}r\text{-}bat}$), tip-ground ($I_{dc\text{-}gt}$), ring-ground ($I_{dc\text{-}rg}$), tip-ring ($I_{dc\text{-}tr}$), and ring-tip ($I_{dc\text{-}rt}$). Finally, the disclosed embodiment also includes selected voltage measurements as part of the scheme for ascertaining line characteristics. These voltage measurements include: measurement-dc-volts ($V_{dc\text{-}meas}$), tip-prebco-dc-volts ($V_{dc\text{-}t\text{-}prebco}$), ring-prebco-dc-volts ($V_{dc\text{-}r\text{-}prebco}$), tip-ground-dc-volts ($V_{dc\text{-}tg}$), ring-ground-dc-volts ($V_{dc\text{-}rg}$), tip-ring-dc-volts ($V_{dc\text{-}tr}$), ring-tip-dc-volts ($V_{dc\text{-}rt}$), tip-ac-volts ($V_{ac\text{-}t}$), ring-ac-volts ($V_{ac\text{-}r}$), tip-ring-ac-volts ($V_{ac\text{-}tr}$), and ring-tip-ac-volts ($V_{ac\text{-}rt}$).

Accompanying these primary measurements is a group of validity conditions indicating whether a measurement is usable for further condition or segmentation analysis. These basic measurement conditions are 'true' or 'false' valued and include: Capacitance validity conditions (e.g. mutual-capacitance-valid, cable-capacitance-valid, tip-ground-capacitance-valid, ring-ground-capacitance-valid, tip-ring-capacitance-valid, ring-tip-capacitance-valid); AC current validity conditions (e.g. tip-ground-ac-current-valid, ring-ground-ac-current-valid, tip-ring-ac-current-valid, ring-tip-ac-current-valid, tip-mutual-ac-current-valid, ring-mutual-ac-current-valid); and Voltage validity condition (prebco-available).

The preferred mid-band frequency tests include: AC2 test at 20 KHz, common-mode with logarithmic spectrum; AC2 test at 20 KHz, differential mode with logarithmic spectrum; AC3 test at 20 KHz, combined common and differential mode with linear test spectrum; AC3 test at 9 KHz, two-terminal loop impedance; and AC3 test at 20 KHz, three-terminal line impedance.

As indicated above, the AC2 refers to a to 2-terminal mid-band test whereas the AC3 refers to a three terminal mid-band frequency test. The AC2 drive source is either in common or differential mode where the AC3 measurement implies a sequential combination of common mode and differential mode measurements. The mid-band frequency tests of the line under test and resulting data, (e.g. resistance, capacitance, impedance, conductance, susceptance, current, voltage, validity, etc) are performed at multiple test frequencies between about 4 KHz and 20 KHz, frequency resolutions and drive conditions.

Identifying Line Conditions

Using the narrow-band resistance measurements, capacitance measurements, low frequency AC current measurements, DC current measurements, and voltage measurements identified above, it is possible to ascertain selected line conditions of the line under test. Broadly speaking, the primary line conditions include the following:

Metallic Access Condition: This indicates whether a line was in use for voice service when last accessed by a loop diagnostic unit to perform measurements.

Ringer Condition: This indicates whether any premises equipment on the line is in an off-hook state.

Hazardous Volts Condition: This indicates whether any safety impacting voltage conditions are present on the line.

Termination Condition: This indicates the state of any voice service related premises or network termination equipment at the subscriber end of the line.

Cable Condition: This defines the overall condition of the twisted pair or cable associated with the line this condition includes a cable status, a cable length (where available), and an imbalance length (where available). The cable length defined here is the primary derivation useful for voice telephony analysis. This is the cable length corrected to eliminate switch test bus and main distribution frame (MDF) contributions of AC currents and capacitance. However, before cable length can be used for ADSL service assurance analysis it must be processed further.

Dispatch Condition: This includes the most voice service affecting fault and the fault jurisdiction assigned to the line by LTS5 analysis. While this is the major outcome of LTS, it is evaluated as just another input condition for ADSL service assurance analysis.

Signature Condition: This defines the overall condition of the line with respect to the presence of any specialized equipment whose narrow band AC and DC characteristics fit certain standard profiles. This condition includes signature-status, signature-type. The signature status indicates whether any signature has been encountered. The signature type indicates a best efforts attempt to identify the general or specific type of equipment discovered on the line.

Table 1 identifies the specific line conditions of interest and list of possible values.

TABLE 1

Primary Line Conditions

| CONDITION NAME | POSSIBLE VALUES | COMMENTS |
|---|---|---|
| MetalicAccessbCondition | IDLE_LINE_ACCESSED | |
| | BUSY_LINE_ACCESSED | |
| RingerCondition | OFF_HOOK_DETECTED | |
| | OFF_HOOK_NOT_DETECTED | |
| HazardousVoltsCondition | HAZARDOUS_AC_VOLTS | |
| | HAZARDOUS_DC_VOLTS | |
| | NO_HAZARDOUS_VOLTS | |
| TerminationCondition | TERMINATION_NOT_AVAILABLE | The status of the termination cannot be determined. |
| | NO_TERMINATION | The subscriber end of the line has no premises or network termination equipment. |
| | BRIDGED_TERMINATION | A bridged ringer is detected. |
| | ABNORMAL_TERMINATION | Voice service termination equipment is detected, but signature is atypical. |
| | NETWORK_TERMINATION | A remote isolation or network demarcation device is detected. |
| | NO_NETWORK_TERMINATION | No remote isolation or network termination device is detected. |
| Cable-Status | CABLE_NOT_AVAILABLE | The status of the cable cannot be determined. |
| | CABLE_NORMAL | Status of the cable is normal |
| | NO_CABLE | No cable was detected on the line. |
| | TIP_IMBALANCE | The tip leg is shorter then the ring leg. |
| | RING_IMBALANCE | The ring leg is shorter than the tip leg. |
| | TIP_DISCONNECT | An exchange disconnection on the tip leg. |
| | RING_DISCONNECT | An exchange disconnection on the ring leg. |
| Cable Length | <#Value> | Length of the cable in feet where cable has a normal, imbalance, or disconnect status |
| Cable Imbalance-Length | <#Value> | Length of the imbalance in feet where the cable has an imbalance or disconnect status. |
| Signature Type | EQUIPMENT_SIGNATURE | |
| | LINE_TREATMENT_EQUIPMENT | |
| | OTHER_STATION_EQUIPMENT | |
| | MUSIC_SPLITTER | |
| | RF_FILTER | |
| | DACS | |
| | INDETERMINATE | |
| | NONE | |
| Signature Status | DETECTED | |
| | NOT_DETECTED | |
| | INDETERMINATE | |
| Dispatch Status | NO_DISPATCH | No fault jurisdiction is assigned. |
| | TESTED_OK | No fault identified. |
| | FAULT_EXCHANGE | Major fault has been identified - exchange. |
| | FAULT_CABLE | Major fault identified - outside cable plant. |
| | MINOR_FAULT_CABLE | Minor fault identified - outside cable plant |
| | FAULT_PREMISES | Major fault identified at or near premises. |
| | MINOR_FAULT_PREMISES | Minor fault identified at or near the premises. |
| Dispatch Cause | OPEN, BALANCE_OPEN | |
| | IMBALANCE_OPEN | |
| | OPEN_IMBALANCE_TIP | |
| | OPEN_IMBALANCE_RING | |
| | OPEN_AND_RESISTANCE | |
| | IMBALANCE | |
| | IMBALANCE_TIP | |
| | IMBALANCE_RING | |
| | DISCONNECT_TIP | |
| | DISCONNECT_RING | |
| | CROSS | |
| | GROUND | |
| | SHORT | |
| | RECTIFIED_SHORT, | |
| | HAZARDOUS_DC_VOLTAGE | |
| | HAZARDOUS_AC_VOLTAGE | |
| | BACKGROUND_NOISE | |
| | POWER_INFLUENCE | |
| | DIALTONE_PROBLEM, | |
| | LINE_CIRCUIT_PROBLEM | |
| | ROH_DETECTED | |
| | CPE_PROBLEM | |
| | BATTERY_PROBLEM | |
| | DLC_PROBLEM, | |

TABLE 1-continued

Primary Line Conditions

| CONDITION NAME | POSSIBLE VALUES | COMMENTS |
|---|---|---|
| | ABNORMAL_LINE_CONDITION ABNORMAL_TERMINATION EQUIPMENT_SIGNATURE, LINE_TREATMENT_EQUIPMENT OTHER_STATION_EQUIPMENT | |

While all of the above-identified primary line conditions are useful in determining the overall condition of the cable or line, it is the imbalance in the telephone cable that is perhaps the most significant impairment as far as ADSL service assurance is concerned. An imbalance can be caused by any of the following sources: metallic faults, resistive imbalance, or capacitive imbalance. Each of these impairments produces line imbalance of different levels with respect to ground. Therefore, the longitudinal balance of the line is compromised resulting in increased longitudinal conversion loss. This, in turn, can make the cable pair vulnerable to crosstalk and EMI noise if present in the bundle. However, different sources of imbalance impact ADSL service in different manners. In addition, where the higher frequency ADSL data link is affected, there may or may not be an affect on lower frequency voice service. Thus, a line test system using voice band frequencies alone will not be adequate to test ADSL service.

Figure 3:
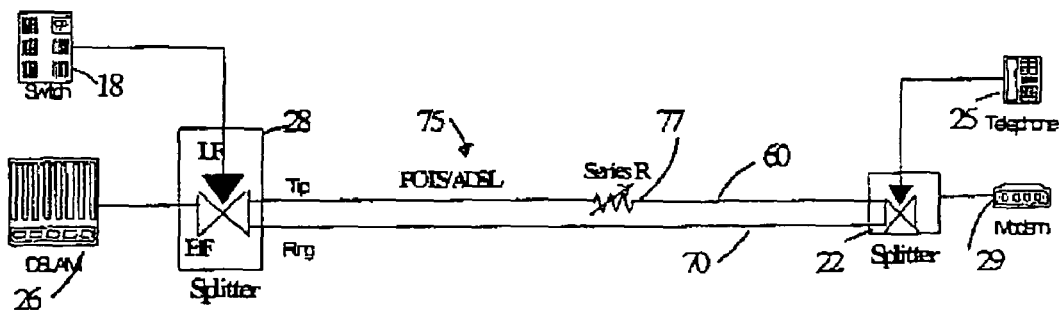
FIG. 3 is a schematic representation of Series Resistance in an ADSL Loop.

Resistive imbalance, caused by Series Resistance (SR) in the line, also affects the line balance. FIG. 3 shows a pictorial representation of SR in an ADSL line 75. As seen therein, the cable loop includes a tip leg 60 and ring leg 70 of the cable pair connected at one end to the CO splitter 28 and at the other end to a second splitter 22. Upstream of the CO splitter 28 on the low frequency coupling is the voice switch 18 while the higher frequency coupling is connected to the DSLAM 26. Premises equipment such as modem 29 or telephone 25 are coupled appropriately to the lower frequency or higher frequency path within the splitter 22 depicted at or near the premises end of the ASDL line under test 75. Series Resistance (SR) 77 is typically introduced by a bad splice or solder in the cable or a damaged conductor. If such splice is exposed to air, the value of the fault is often stimulated by oxidation process caused by the loop current, making it time varying and intermittent in nature. These faults are sometime referred to as high-resistance or high impedance faults. The imbalance due to a single leg series resistance in a loop would cause asymmetry in the voltage measurement about earth or ground.

Figure 4:
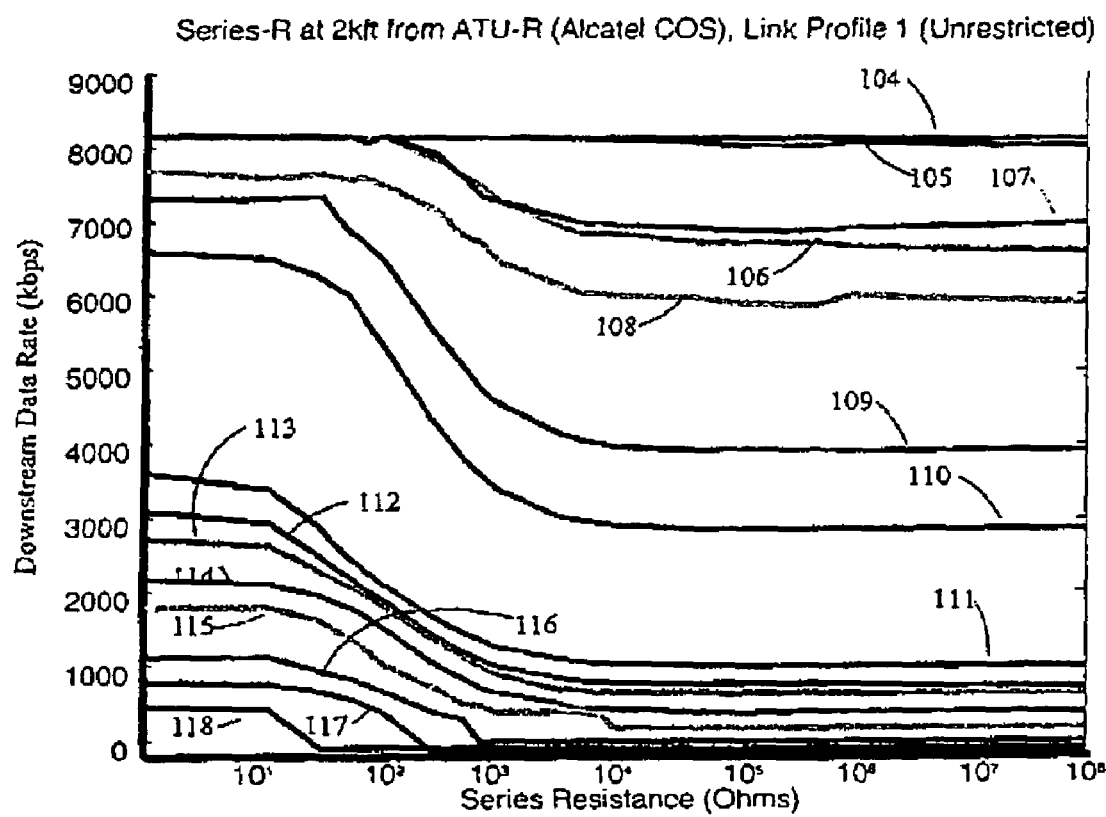
FIG. 4 is a graph that depicts the downstream data rates of an ADSL link in relation to the variation in Series Resistance for multiple loop lengths.
Figure 5:
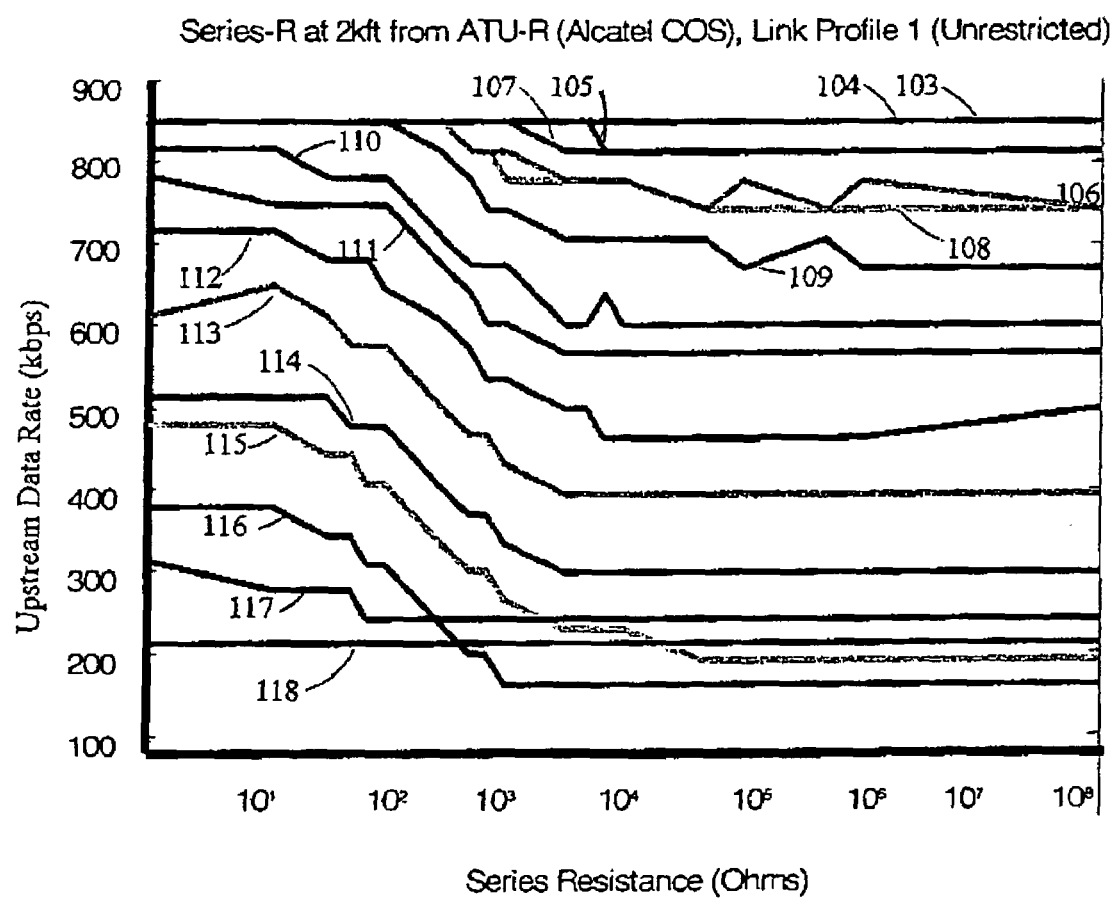
FIG. 5 is a graph that depicts the upstream data rates of an ADSL link in relation to the variation in Series Resistance for multiple loop lengths.

FIG. 4 and FIG. 5 show the downstream and upstream data rates of an unrestricted ADSL link in relation to the variation in SR for multiple loop lengths. See also Table 2. The performance (i.e. data rate) in both upstream and downstream directions decreases as the value of the fault series resistance increases. These graphs use empirical data to demonstrate that the series resistance condition in the loop can cause major impact on ADSL service. A speed degradation or complete loss in service may be observed depending upon the length of the line and associated value of the fault resistance. A few Mbps drop in data rate is common for a SR as low of 200 Ohms. Such empirical data, as seen in FIG. 4 and FIG. 5 can be used in the form of look-up tables, estimating tools, or can be used to establish parameter thresholds as part of a DSL performance assessment system.

TABLE 2

Legend for FIGS. 4, 5, 7, and 8

| FIGS. 4, 5, 7, &8 Ref. Nos. | Line Characteristic |
|---|---|
| 103 | 3000 ft - 26 awg |
| 104 | 4000 ft - 26 awg |
| 105 | 5000 ft - 26 awg |
| 106 | 6000 ft - 26 awg |
| 107 | 7000 ft - 26 awg |
| 108 | 8000 ft - 26 awg |
| 109 | 9000 ft - 26 awg |
| 110 | 10000 ft - 26 awg |
| 111 | 11000 ft - 26 awg |
| 112 | 12000 ft - 26 awg |
| 113 | 13000 ft - 26 awg |
| 114 | 14000 ft - 26 awg |
| 115 | 15000 ft - 26 awg |
| 116 | 16000 ft - 26 awg |
| 117 | 17000 ft - 26 awg |
| 118 | 18000 ft - 26 awg |

Figure 6:
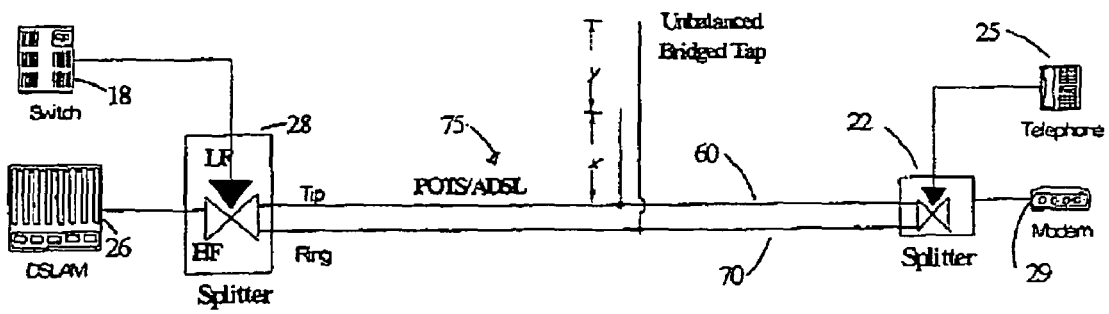
FIG. 6 is a schematic representation of capacitive imbalance in an ADSL Loop.

Capacitive imbalance is another common line condition contributing to line balance. FIG. 6 shows a typical capacitive imbalance scenario with an unbalanced bridged tap in an ADSL line 75. Similar to FIG. 3, the cable loop includes a tip leg 60 and ring leg 70 of the cable pair connected at one end to the CO splitter 28 and at the other end to a second splitter 22. Upstream of the CO splitter 28 on the low frequency coupling is the voice switch 18 while the higher frequency coupling is connected to the DSLAM 26. Premises equipment such as modem 29 (high frequency) or telephone 25 (low frequency) is depicted at the premises end of the ASDL line under test 75. The influence of capacitive imbalance on ADSL service will depend upon the length of the tap (y) causing the imbalance and its location (x).

Figure 7:
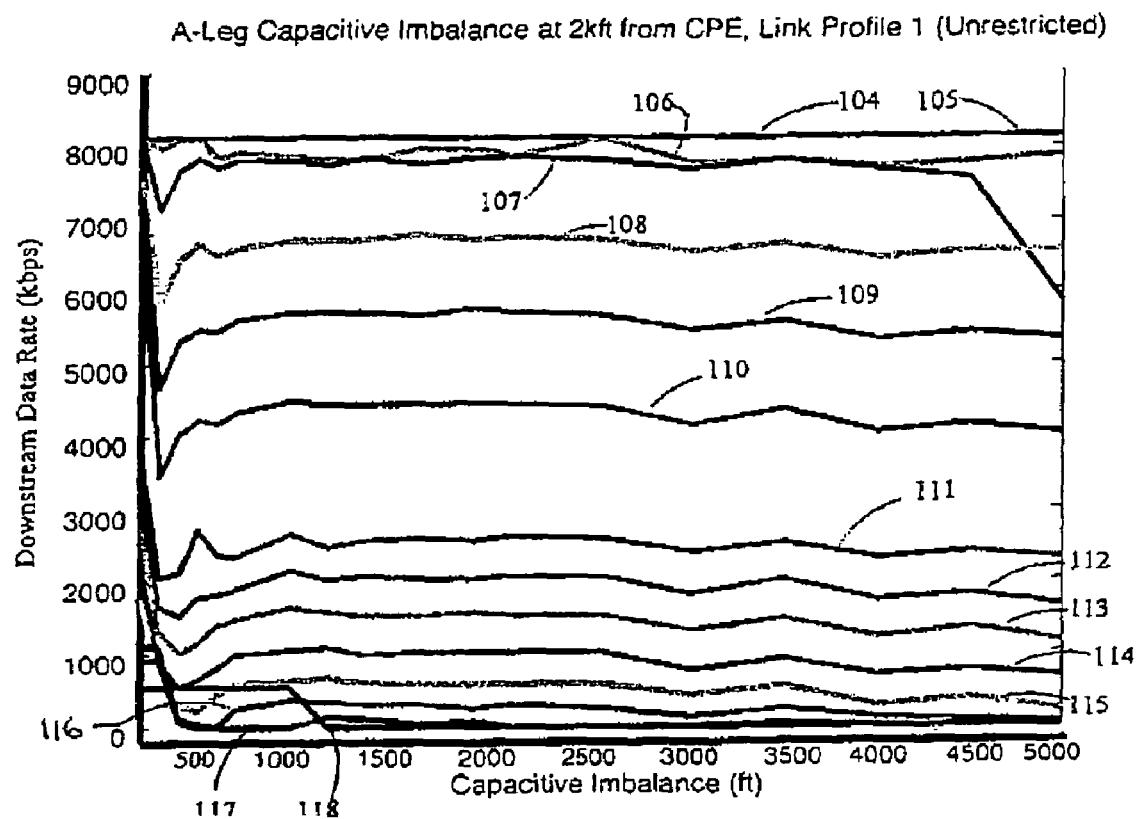
FIG. 7 is a graph that depicts the downstream data rates of an ADSL link in relation to the variation in capacitive imbalance for multiple loop lengths.
Figure 8:
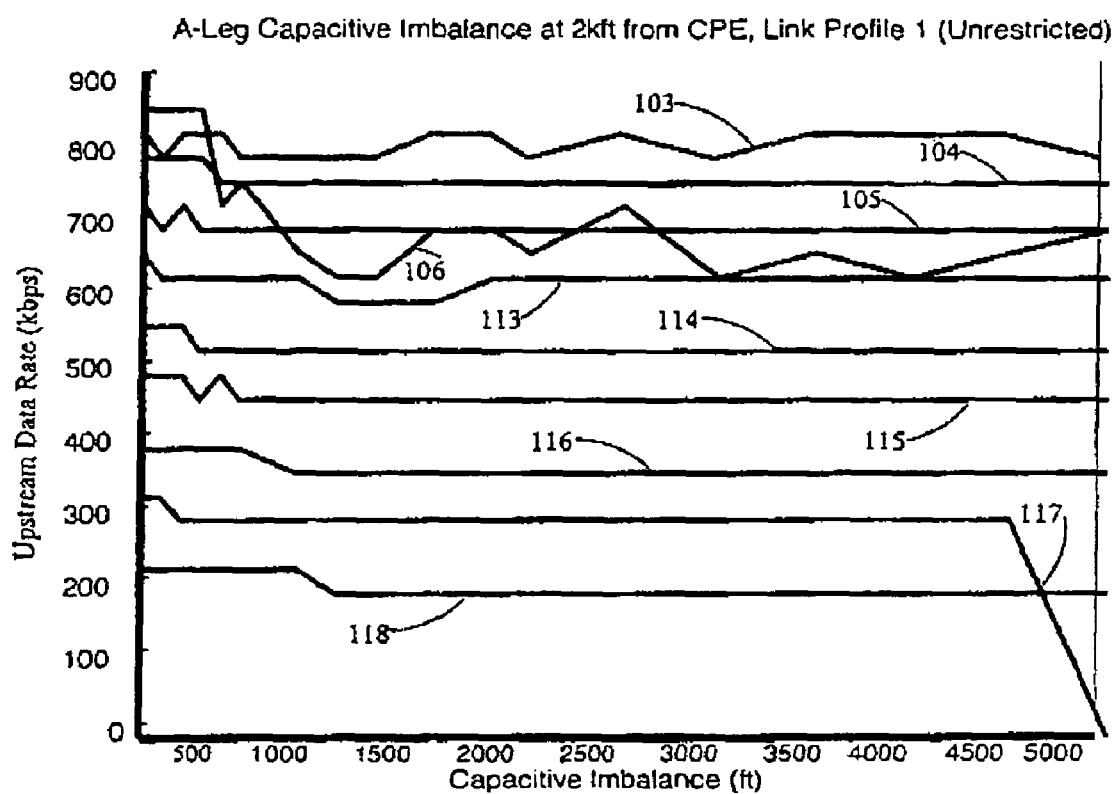
FIG. 8 is a graph that depicts the upstream data rates of an ADSL link in relation to the variation in capacitive imbalance for multiple loop lengths.

FIG. 7 and FIG. 8 show the performance of the same set of loops with respect to variations in capacitive imbalance applied to the line under test (see also Table 2). Capacitive imbalance also exhibits a significant impact on the link performance however, the behavior of this impact is quite different as compared to a line with SR. The impact of capacitive imbalance can be explained by the fact that the unbalanced tap behaves like an antenna and introduces noise into the ADSL circuit. This is validated by the observation that there is relatively little affect on the upstream ADSL channel where the signal-to-noise ratio (SNR) is generally higher. As indicated above, the empirical data of FIG. 7 and FIG. 8 or similar such data can be used in the form of look-up tables, as parameter thresholds, or even as part of estimating techniques as part of a DSL performance assessment system.

Figure 9:
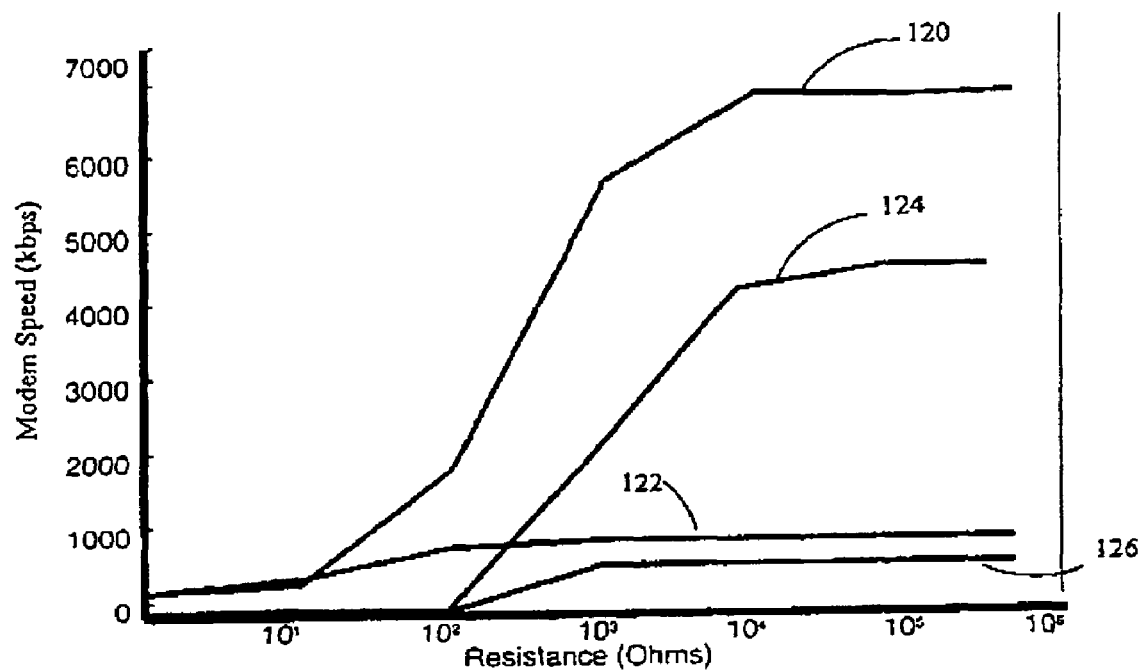
FIG. 9 is a graph that depicts the downstream data rate of an ADSL link in relation to the variation in tip to ground resistance for varying loop lengths.

A third form of line imbalance is a result of metallic faults on the line such as shorts, grounds and contacts, affect the balance of the line. FIG. 9 shows the downstream data rate of an unrestricted ADSL link in relation to the variation in tip to ground resistance for varying loop lengths for 12000 foot line (DN) (reference numeral 120), 12000 foot line (UP) 122, 9000 foot line (DN) 124 and 9000 foot line (UP) 126. These conditions typically are caused by exposure of the cable to groundwater that can reduce the isolation between conductors or between conductors and the sheath resulting in increased conductivity.

In practice, SR is typically originated due to a poor splice or joint. In a corrosive environment, such as exposure to air and water ingress in the cable, the conductivity of the splice can change over time due to oxidation resulting is a time-varying resistance. These variable impairments are generally referred to as "swinging" or unstable SR faults. For the specific purpose of maintaining cable splice integrity by preventing the build-up of oxidation, a small DC current is applied to the loop. This is known as known as wetting or "sealing" current. An ADSL circuit relies on the wetting current provided by off-hook loop current. Every time the receiver is picked up, the line voltage applied across a bad splice produces an arcing effect over the discontinuity that can remove the dirt layer or corrosion that can build over time creating an SR. On the other hand, such a fault can grow to a very large value if the phone is not in use over a long period. Generally, an unstable SR would vary cyclically over time due to the splice oxidation and de-oxidation resulting from changes in the line current. Therefore, an attempt is made to discern between static and time-varying faults during line balance analysis.

The input signal to ADSL line imbalance analysis is represented as:

$$V_{tip}(f_k) = \{a_{tip-k}, b_{tip-k}\}, k=1 \ldots 45.$$

$$V_{ring}(f_k) = \{a_{ring-k}, b_{ring-k}\}$$

where:

$$a_{tip-k} = c_k \cos \theta_k,$$

$$b_{tip-k} = c_k \sin \theta_k$$

Thus, $a_{tip-k}$ and $b_{tip-k}$ are the real and imaginary part of the peak amplitude voltages corresponding to the 45 test frequencies in the received signal respectively and are associated with ring leg of the cable pair. Variables $c_k$ and $\theta_k$ are amplitude and phase of these quadrature components, respectively. Similarly, $a_{ring-k}$ and $b_{ring-k}$ are the real and imaginary part of the peak amplitude voltages corresponding to the multiple test frequencies in the received signal associated with ring leg of the cable pair.

Three different metrics for detection and characterization of the imbalance are possible using the mid-band frequency measurements:

$$I_m = \sum_{k=k_{min}}^{k_{max}} [\|V_{tip}(f_k)\| - \|V_{ring}(f_k)\|]$$

$$I_p = \sum_{k=k_{min}}^{k_{max}} [\angle V_{tip}(f_k) - \angle V_{ring}(f_k)]$$

$$I_{MoD} = \sum_{k=k_{min}}^{k_{max}} [\|V_{tip}(f_k) - V_{ring}(f_k)\|]$$

where the typical values of $k_{min}=1$ and of $k_{max}=33$ ($f_{33}=4.9$ kHz). Therefore, ADSL line imbalance analysis may use a partial spectrum of the logarithmic test signal. This restriction minimizes the influence of the CO splitter on the analysis and allows testing through any switch test bus as CO splitters and switch test buses can introduce additional magnitude or phase affects at selected frequencies in the mid-band. The selection of appropriate frequencies for imbalance analysis is called compensation. Note that the three equations above provide different but equivalent measures of asymmetry between the tip and ring of the loop with respect to ground. Any one can be utilized for line imbalance evaluation.

The preferred method takes the appropriate line measurements and calculates the line imbalance parameters ($I_m$ and $I_p$) both before introducing high DC voltages onto the line ($I_{m-pre}$ and $I_{p-pre}$.) and after introducing high DC voltages onto the line ($I_{m-post}$ and $I_{p-post}$). The calculations are then compared to prescribed imbalance detection threshold $\Gamma_m$. More specifically, the present method performs a comparison between $I_{m-pre}$ and $\Gamma_m$. If $I_{m-pre} > \Gamma_m$ the analysis provides an indication that an imbalance condition is detected, otherwise it provides and indication that a imbalance condition is not detected. Likewise, the imbalance parameter $I_{m-post}$, is compared to the imbalance detection threshold $\Gamma_m$. If $I_{m-post} > \Gamma_m$ the preferred method provides an indication that an imbalance condition is detected, otherwise it provides and indication that an imbalance condition is not detected. Similarly, the imbalance parameters $I_{p-pre}$, and $I_{p-post}$, are also compared to the imbalance detection threshold $\Gamma_p$. If $I_{p-post} > \Gamma_p$ or $I_{p-pre} > \Gamma_p$, the method provides an indication that an imbalance condition is detected, otherwise it provides and indication that an imbalance condition is not detected.

Discriminating between a capacitive imbalance and resistive imbalance is preferably addressed using multiple techniques including narrow-band frequency parametric data analysis, historical line stability analysis, and real-time line stability analysis.

The first technique assesses the real time stability of the line under test. By comparing the difference between the $I_{p-pre}$ and $I_{p-post}$ calculations or the $I_{m-pre}$ and $I_{m-post}$ calculations, and comparing such differences to a change threshold ($\Delta I_m$ or $\Delta I_p$ as the case may be), it is possible to ascertain the real-time stability of the line.

A second imbalance classification technique is a historical line stability assessment. For example, the pattern of line imbalance calculations ($I_m$ and $I_p$,) over several days can help differentiate between a capacitive or resistive source of imbalance. As described earlier, SR faults are typically time varying in nature. On the other hand, the pure capacitive imbalances are static. Therefore if no changes in the line imbalance calculations ($I_m$ and $I_p$,) are observed over time, it generally indicates the existence of a capacitive imbalance. Otherwise a resistive imbalance or SR is the likely cause of the imbalance.

A third imbalance classification technique utilizes narrow-band frequency parametric data. Typically, a resistive imbalance or SR in the loop results in reduced tip-to-ring conductance of the line. Once an imbalance is detected in the line, the conductance across the pair is compared against a threshold to determine the nature of the imbalance. Typically, there is no significant change in tip-ring conductance (Gtr) for loops with capacitive imbalance. Alternatively, the tip-to-ground and ring-to-ground impedances provide another way of imbalance classification. Knowing that the ADSL loop is a mostly a capacitive load, logic can be applied to distinguish between capacitive and resistive imbalances. This approach can resolve majority of capacitive versus resistive imbalances. Figure x depicts the preferred method for determining whether the imbalance calculated using narrow-band frequency measurements is capacitive or resistive.

Each of the aforementioned techniques can be used alone or in conjunction with each other to reach a determination of whether an imbalance exists and the nature of such imbalance.

Line Condition Fault Ranking and Impact Analysis

The preferred test and analysis method also evaluates the effect of each critical line condition on DSL performance relative to expected quality of service parameters obtained from the DSL service profile. Such analysis must consider the effect of resistive imbalance, capacitive imbalance, resistance, and other conditions on the line, many of which were determined using the mid-band frequency tests.

A general technique is used in ranking the effect of an imbalance or resistive fault on upstream or downstream performance. This technique is to select a predicted upstream and downstream data rate from one of the performance models and compare it to the minimum promised upstream and downstream data rates from the DSL profile for the line. If the predicted data rate is much above the minimum promised, then the line condition is ranked as not service affecting. If the predicted data rate is somewhat above the minimum promised data rate the line condition is ranked as suspect. If the predicted data rate is within some small range above or below the minimum promised data rate the line condition is ranked as minor. If the predicted data rate is much below the minimum, promised data rate the line condition is ranked as major. Of course, in actual analysis, quantitative assessments replace these qualitative ones.

There are some complications since the line models offer several predicted data rates for varying levels of cable bundle occupation. For example, consider the predicated data rate for a line in a no noise situation, one where no other line in the cable bundle offers DSL or other high-speed data service. Under these conditions, if the predicted data rate is much below the minimum, promised data rate the line condition is ranked as major. Analysis can stop here without the need to consider predicted data rates under more service effecting noise environments. If the line is predicted not to support some minimum data rate even under the most favorable noise conditions, in more realistic noise environments performance can only be predicted to be worse. On the other hand, consider the predicated data rate for a line in a high noise situation, one where almost every other line in the cable bundle offers DSL or other high-speed data service. Under these conditions, if the predicted data rate is much above the minimum, promised data rate the line condition is ranked as not service affecting. Analysis can stop here without the need to consider predicted data rates under less service effecting noise environments. If the line is predicted to support some minimum data rate even under the least favorable noise conditions, in more favorable noise environments performance can only be predicted to be better. Other situations, where the noise level or the predicted data rate is not extreme require additional business logic to access. To some extent service provider specific thresholds will control this business logic.

Even if the effect of a resistive imbalance, capacitive imbalance, or resistance line condition is only suspect or not service effecting, the line condition might cause the line to be more susceptible to the effects of ingress noise. This could cause the line intermittently to exhibit more degraded performance. Line conditions are associated with susceptibility factors through the various line models. Service provider and line condition specific thresholds are applied to these severity factors to rank line susceptibility as Not Susceptible, Severe, Moderate, Suspect, or Indeterminate. Alternatively, the line condition could cause the line to radiate noise that might affect data service on other lines in the same bundle. Hence, these line conditions are ranked with respect to how severely they expose the line or other lines to excessive noise. Again, service provider and line condition specific thresholds are applied to these severity factors to rank line radiation as Not Radiating, Severe, Moderate, Suspect, or Indeterminate.

The service provider typically establishes the thresholds for each service profile that help determine the acceptable margins for upstream and downstream data rates relative to the minimum promised data rates for each named profile in each named DSLAM as well as establish noise susceptibility and radiation impact thresholds for each line condition.

To this point, the performance and availability status of the DSL line and service have been underpinned by real-time narrow-band frequency and mid-band frequency test measurements, associated calculations, and data analysis. The present embodiment also includes additional data analysis processes that evaluate the significance of changing trends in line characteristics and line conditions over time. These historical and trend analyses are supported by previous iterations of narrow-band frequency and mid-band frequency tests, calculations, and associated data analysis performed on each line on a periodic basis (e.g. scheduled background test) or on a demand basis (e.g. real-time diagnostic test). These previous iterations of the tests and/or calculations are typically maintained in some form of persistent storage for later retrieval, subject to available persistent storage resources.

Once the appropriate fault rankings are established, the disclosed test and analysis method evaluates the impacts, the possible service level agreement or agreements that apply to the subscriber, and the results of external data-source interchanges. The result of this impact analysis is to identify the most impacting line condition, the impact of that condition with respect to appropriate service level agreements, and the jurisdiction of that line condition. Preferably, the impact analysis includes an assignment of the DSL service into one of the following categories: (1) ok service; (2) degraded service; (3) no service; (4) intermittent service; (5) suspect service; or (6) indeterminate. Each of these bins can be associated with a particular color such as green for 'ok service', red for 'no service', orange for 'degraded service', yellow for 'suspect service', blue for 'intermittent service', gray for 'indeterminate', or other colors as may be appropriate. These assessments are with respect to each possible service level agreement or agreements to which the subscriber may be associated.

Detailed Test & Analysis Methodology

Figure 10:
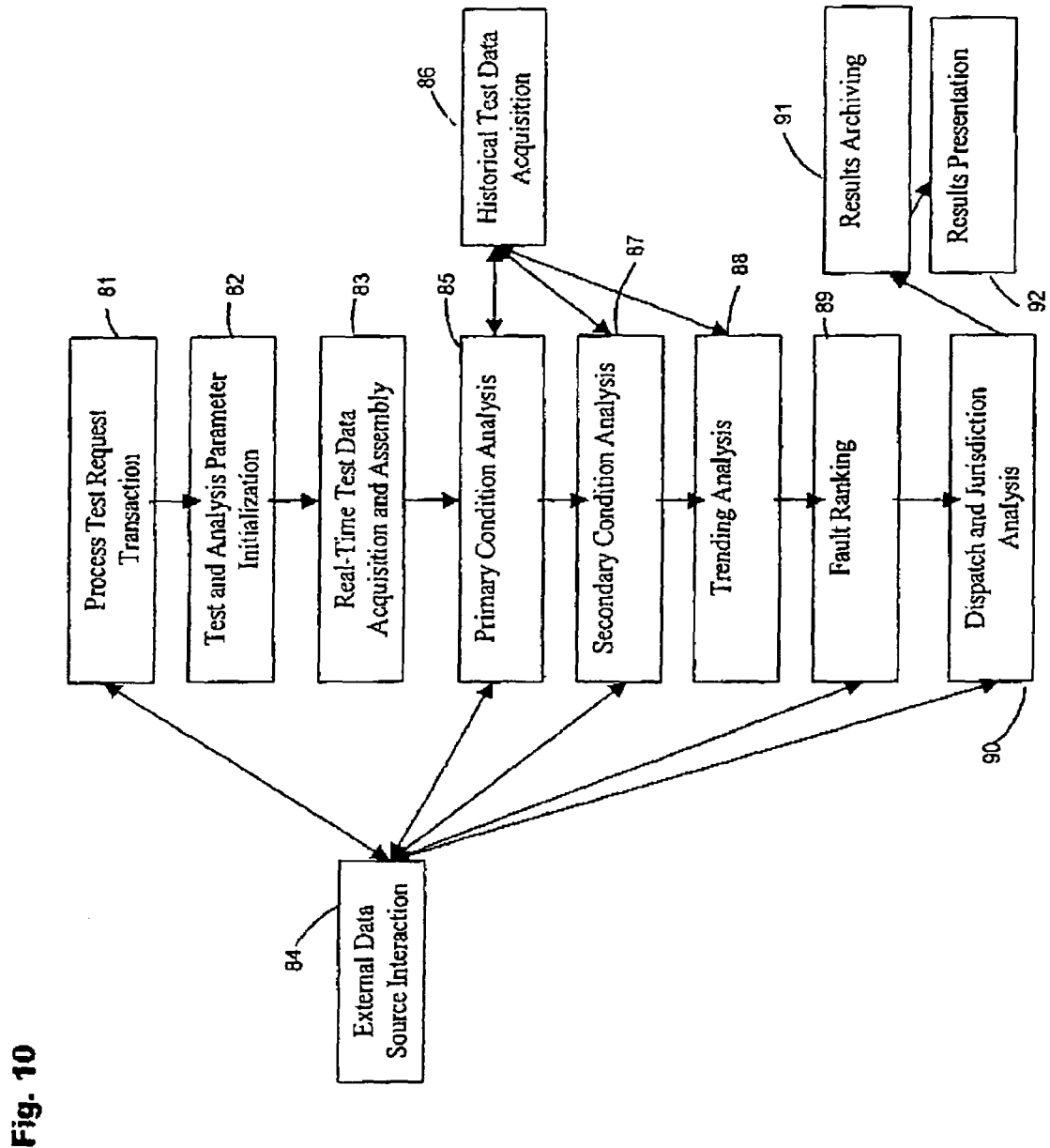
FIG. 10 is a flowchart depicting the preferred embodiment of the present DSL Test and Analysis Method.

Turning now to FIG. 10, the twelve phases of the preferred test and analysis method 80 are depicted. The exact order, sequence, and execution of the steps or phases may be interchanged or even skipped altogether, depending on the identified or anticipated line conditions and selected performance models.

Phase 1—Process Test Request Transaction (Block 81). This phase accepts a test transaction. The test transaction generally includes service provider identification, test type, circuit access information (directory number, switch name, circuit identification), DSL equipment information, customer problem report, and DSL service profile name.

Phase 2—Test and Analysis Parameter Initialization (Block 82). This phase obtains general information about the ADSL environment including service profiles, business rules, line models, and analysis thresholds. Such environment related information includes both generic and provider specific elements.

Phase 3—Real-Time Test Data Acquisition and Assembly (Block 83). This phase instructs the LDU servicing the line to initiate and obtain voice-band and mid-band test measurements.

Phase 4—External Data Source Interaction (Block 84). This phase accesses any external data or source information necessary from the test operator, the subscriber, the operation support system (OSS), or other users.

Phase 5—Primary Condition Analysis (Block 85). Perform analysis to develop primary line condition information from the real-time test measurements, and archived measurement and condition information.

Phase 6—Historical Test Data Acquisition (Block 86). This phase accesses archived measurement and condition information for the line under test.

Phase 7—Secondary Condition Analysis (Block 87). This phase performs data analysis to develop performance and noise model-based secondary line-condition information from the primary line conditions, real-time measurements, and archived line test measurements and condition information.

Phase 8—Trending Analysis (Block 88). This phase performs selected data analysis to develop line condition trend information related to the line under test.

Phase 9—Fault Ranking (Block 89). This phase of the test and analysis method perform an analysis to identify critical line conditions and rank the impact of each critical line condition on ADSL performance and availability.

Phase 10—Dispatch and Jurisdiction Analysis (Block 90). This phase performs jurisdiction analysis necessary to develop repair location, fault statement, affecting condition, and other fault summary information.

Phase 11—Results Archiving (Block 91). This phase of the preferred test and analysis method performs analysis to determine if the current measurements and line conditions for this line should be archived and if any previously archived information about this line should be purged. If necessary, update the archive in persistent storage.

Phase 12—Results Presentation (Block 92). This phase of the preferred test and analysis method prepares summary and detailed information for the service provider or subscriber as a response to the test transaction and provides the results and information via an appropriate user interface.

Additional information relating to each of the twelve identified phases of the preferred test and analysis method 80 is provided in the paragraphs that follow.

Phase 1—Process Test Request Transaction

This phase of analysis handles the test request transaction that initiates data collection for the line under test. It processes each of the transaction inputs into a canonical internal format and makes the information available for subsequent analysis steps. Where inputs are missing or inappropriate default values will be provided. The following steps are performed within this initial phase.

(a) Collect the service provider identification and test type input from a request transaction, performs a time stamping operation, and provides the service provider identification, test type and test start time. Test types include 'batch mode' or 'immediate mode.'

(b) Look up of any necessary generic and provider specific request defaults.

(c) Identify circuit access information including the directory number, the equipment number, the internal circuit identification, and the switch short name of the line under test.

(d) Map the internal circuit identification and switch short name to an internal switch element identification.

(e) Collect DSL equipment description information from the test request input and request defaults. This information includes the DSLAM name, vendor and type, ATU-C vendor and type, and DSL circuit type. The DSL circuit type indicates the protocol standard supported by the circuit between the ATU-C and ATU-R. For example, the DSL circuit type could be one of 'G992.2 G.lite', 'G992.1 G.DMT', or any other standard DSL protocol designation.

(f) Identify the DSL service profile name from the test request input and the request defaults. Map a service profile name that is not available to the appropriate request default value and provides the profile name.

Phase 2—Test and Analysis Parameter Initialization

This is the test and analysis phase where service provider and market specific data will be accumulated from persistent storage associated with the DSL Test System. This data includes parameter thresholds, test path compensation factors, and DSLAM to MDF compensation factors. The following steps are performed within this second phase.

(a) Identify the path compensation factors using a lookup table and the switch identification (SWID) and DSLAM name as a selector.

(b) Perform a lookup of the analysis parameters for the named switch. These factors are a set of thresholds for use in subsequent phases of analysis.

(c) Retrieve the service profile information. If the service profile information available from persistent storage, the information is retrieved directly from the lookup table using DSLAM as the selector. In the preferred embodiment, the persistent storage maintains service profile information in the form of a lookup table with one row for each named profile for each named DSLAM. If service profile information is not available from persistent storage, the analysis system retrieves the service profile information from an external source via a request transaction.

Phase 3—Real-Time Test Data Acquisition and Assembly

This is the test and analysis phase where real-time narrow-band frequency and mid-band frequency test measurements are requested from an LDU and the results are stored for subsequent analysis. The preferred test measurements include those typical for a POTS LTS and additional mid-band frequency test measurements. The following checks, measurements and detections are included within this third phase.

(a) Narrow band frequency test measurements, including a plurality of resistance measurements, capacitance measurements, low frequency AC current measurements, DC current measurements, and voltage measurements.

(b) Mid band frequency test measurements.

(c) Validity Checks of collected mid-band and narrow band frequency measurements.

(d) Signaturized splitter detection.

Phase 4—External Data Source Interaction

The next test and analysis phase performs a sequence of interactions with the customer or agents of the service provider (Tier 1 and Tier 2 personnel) and/or Operation System Support (OSS). More particularly, the presently disclosed system interacts through a graphical interface to obtain data from human operators (i.e. Tier 1, 2) or through a machine-machine interface with the OSS to obtain the same information. Information requested from the human operators may include a problem report, problem severity, and problem duration for both voice service and DSL service. Information requested from the OSS preferably includes service profile information and ATU-R vendor and type information. The following specific steps are performed within this fourth phase.

(a) The customer voice service problem identification, including problem report, problem severity and problem duration. The customer voice service problem report could be one of: not available, no dial tone (NDT), can't be called (CBC), can't call out (CCO), can't hear (CH), can't be heard (CBH), noise (NOI), and so on. The problem severity classifications include: 'not available', 'indeterminate', 'major' or 'minor'. The problem duration may be classified as 'not available', 'indeterminate', 'continuous' or 'intermittent'.

(b) The customer DSL service problem identification, including problem report, problem severity and problem duration The customer DSL service problem report could be one of: 'not available', 'indeterminate', 'no data transport service', 'data transport service too slow', 'can't receive e-mail', 'can't send email', 'can't send or receive e-mail', 'can't perform online transaction', 'can't download music or video', 'music or video playback of low quality', and so on. The problem severity classifications include: 'not available', 'indeterminate', 'major' or 'minor'. The problem duration may be classified as 'not available', 'indeterminate', 'continuous' or 'intermittent'.

(c) Service Profile Information retrieval performs an interaction with the operation support system using the DslamName and SeriveProfileName as a selector to obtain service profile information. It then moves the service profile information to persistent storage (d) ATU-R Information retrieval performs an interaction with the operation support system using the DslamName as a selector to obtain ATU-R vendor and type information. If this information is unavailable from the operation support system, this knowledge source performs a sequence of interactions with the customer (directly or indirectly through the Tier 1 operator).

Phase 5—Primary Condition Analysis

The critical fifth phase of the subject test and analysis method provides the underlying analysis to determine the primary line condition information from the real-time test measurements as well as archived measurement and condition information. Such primary line conditions are determined using narrow-band frequency and mid-band frequency test measurements, calculations and analysis. The following steps are performed within this important fifth phase.

(a) Identify primary line conditions using narrow-band frequency test measurements.
(b) Establish validity of narrow-band frequency test measurements.
(c) Determine cable length and corrected cable length.
(d) Retrieve footprint information.
(e) Determine premises continuity condition.
(f) Determine Resistive Imbalance Line Condition using mid-band frequency tests.
(g) Determine Capacitive Imbalance Line Condition using mid-band frequency tests.
(h) Determine Metallic Faults Line Condition.
(i) Determine Imbalance Stability.
(j) Determine Imbalance Historical Stability.
(k) Determine Imbalance Type.
(l) Determine cable length normalization parameters.
(m) Determine capacitive imbalance value for narrow band frequencies.
(n) Detect any signaturized splitter in test path.

Phase 6—Historical Test Data Acquisition

The purpose of the next phase is to access archived measurement and condition information for the line under test. The following steps are included in this sixth phase.

(a) Access of persistent storage to obtain archive records for the line under test.
(b) Designates one such archived record as the footprint. The footprint is a record holding test data and line condition information collected at least 72 hours prior to the current test with a Dispatch Condition of 'Tested OK'.
(c) Retrieve historical values of line imbalance factors from persistent storage.

Phase 7—Secondary Condition Analysis

The purpose of the seventh test and analysis phase is to conduct analysis of secondary line conditions that are based on an interpretation of real-time and archived measurements as well as primary line conditions. The following analyses are performed within this phase.

(a) Develop conditions that characterize unstable phase imbalance and predict upstream and downstream data rate in the face of various performance-affecting line conditions.
(b) Collect ATU-C vendor and type information.
(c) Provide upstream and downstream performance values, the line noise susceptibility factor, and the line noise radiation factor, all associated with a level of resistive imbalance.
(d) Provide upstream and downstream performance values, the line noise susceptibility factor, and the line noise radiation factor, all associated with a level of capacitive imbalance.
(e) Provide upstream and downstream performance values, the line noise susceptibility factor, and the line noise radiation factor, all associated with a level of resistance in the line.

Phase 8—Trending Analysis

The purpose of this phase of the test and analysis method is to estimate of the rate of change of imbalance over time. If the imbalance has been increasing over time at a high enough rate then, one could make the assumption that it will become service affecting in the near future. Within this eighth phase, the disclosed embodiment performs selected data analysis, such as linear regression techniques, to estimate of the rate of imbalance change over time.

Phase 9—Fault Ranking

This phase of the test and analysis method identifies critical line conditions and ranks the impact of each critical line condition on ADSL performance and availability. The following data analyses and rankings are performed within this ninth phase.

(a) Rank the capacitive imbalance as 'Severe', 'Minor', 'Suspect', 'Not Service Affecting', or 'Indeterminate' with respect to upstream and downstream data rates.
(b) Rank the resistive imbalance as 'Severe', 'Minor', 'Suspect', 'Not Service Affecting', or 'Indeterminate' with respect to upstream and downstream data rates.
(c) Rank the resistance line condition as 'Severe', 'Minor', 'Suspect', 'Not Service Affecting', or 'Indeterminate' with respect to upstream and downstream data rates.
(d) Rank the noise susceptibility and noise radiation for a line with capacitive imbalance as 'Severe', 'Minor', 'Suspect', or 'Not Service Affecting'.

(e) Rank the noise susceptibility and noise radiation for a line with resistive imbalance as 'Severe', 'Minor', 'Suspect', 'Not Service Affecting', or 'Indeterminate'.
(f) Rank the noise susceptibility and noise radiation for a line with resistance line condition as 'Severe', 'Minor', 'Suspect', 'Not Service Affecting', or 'Indeterminate'.

Phase 10—Dispatch and Jurisdiction Analysis

This phase of the test and analysis method performs jurisdiction analysis necessary to develop repair location, fault statement, affecting condition, and other fault summary information. The following data analyses are performed within this ninth phase.
  (a) If Capacitive Imbalance Fault Rank is major or the Capacitive Imbalance Data Rate Fault Rank is 'Minor' then create a DSL Service Problem Report.
  (b) If Resistive Imbalance Fault Rank is major or Resistive Imbalance Data Rate Fault Rank is 'Minor' then create a DSL Service Problem Report.
  (c) If Resistance Fault Rank is 'Major' or Resistance Data Rate Fault Rank is 'Minor' then create DSL Service Problem Report.
  (d) Modify the Capacitive Imbalance Data Rate Fault Rank based on problem severity and problem duration.
  (e) Modify the Resistive Imbalance Data Rate Fault Rank based on problem severity and problem duration.
  (f) Modify the Resistance Data Rate Fault Rank based on problem severity and problem duration.
  (g) Determine the most unfavorable or worst Data Rate Fault Rank from the respective upstream and downstream Fault Ranks.
  (h) Record the Capacitive Imbalance Problem {'Major', 'Minor', 'Suspect', or 'Indeterminate'}.
  (i) Records the Resistive Imbalance Problem {'Major', 'Minor', 'Suspect', or 'Indeterminate' }.
  (j) Record the Resistance Problem {'Major', 'Minor', 'Suspect', or 'Indeterminate' }.
  (k) Upgrade the Resistive Imbalance Problem, if appropriate, based on line stability analysis.
  (l) Identify the most appropriate Dispatch Condition.

Phase 11—Results Archiving

Determine whether the measurement data and results of the present analysis should be added to the results of previous analysis. In many applications of a DSL Test System, only a finite volume of data and analysis results for each tested line can be saved. The decision of introducing and storing a new test record may require that an existing test record be purged from persistent storage. The following steps are performed within this eleventh phase:
  (a) Evaluate the current test results to determine whether to archive the most recent data and analysis results.
  (b) Delete one or more archived records of prior data and analysis results.

Phase 12—Results Presentation

The purpose of this final phase of the test and analysis methodology is to produce summary information of the performed DSL assessments in a format appropriate to a specific type of client, for example, a graphical user interface client or a web-services client. The twelfth and final phase provides a summary report including some or all of the information presented below.
  (a) Fault statements. This indicates the severity of the fault conditions identified on the line. It can be one of 'Tested OK', 'Major Fault', 'Minor Fault', 'Suspect Fault', and 'Indeterminate'.
  (b) Repair location. This indicates in what jurisdiction to focus the initiation of the repair process.
  (c) Affecting conditions. This is a list of the line conditions that support the fault statement and repair location.
  (d) Cable length. This is the length of the line from the exchange splitter to the premises termination.
  (e) Line balance status. This is 'OK', 'Marginal, Poor', 'Indeterminate', or 'Not Available'.
  (f) Fault stability. This is one of 'Stable', 'Marginal', 'Unstable', 'Indeterminate', or 'Not Available'.
  (g) Maximum downstream data rate. This is an estimation of the maximum data rate the line can achieve in the downstream direction (in Kb/s).
  (h) Maximum upstream data rate. This is an estimation of the maximum data rate the line can achieve in the upstream direction (in Kb/s). It may also be indicated as 'Indeterminate' or 'Not Available'.
  (i) Affecting equipment. This is a list of service affecting equipment whose signatures have been identified including, DACS (pair gain system), RF Filter, Music Splitter, Load Coil, and so on.
  (j) CO Splitter termination status. This indicates the status of the exchange splitter and includes 'Reversed', 'Faulty', 'Detected', 'Not Detected', 'Abnormal', 'Indeterminate', and 'Not Available'.
  (k) ATU-R termination status. This indicates the status of the ADSL premises termination and includes 'Detected', 'Not Detected', 'Abnormal', 'Indeterminate', and 'Not Available'.
  (l) POTS termination status. This indicates the status of the POTS premises termination and includes 'Detected', 'Not Detected', 'Abnormal', 'Indeterminate', and 'Not Available'.
  (m) Noise susceptibility status. This provides an indication of the degree to which the line is susceptible to noise and includes 'Not Susceptible', 'Severe', 'Moderate', 'Suspect', 'Indeterminate', or 'Not Available'.
  (n) Noise radiation status. This provides an indication of the degree to which the line may impact the performance of other lines in the same bundle through radiating noise and includes. 'Not Interferer', 'Severe', 'Moderate', 'Suspect', 'Indeterminate', or 'Not Available'.

From the foregoing, it can be seen that the disclosed invention is a method for DSL testing that employs mid-band frequency test measurements to ascertain selected line conditions that may impact DSL service. While the invention herein disclosed has been described by means of specific embodiments and processes associated therewith, numerous modifications and variations could be made thereto by those skilled in the art without departing from the scope of the invention as set forth in the claims.

What is claimed is:

1. A method for performing a test of DSL capability comprising the steps of:
  accessing a telephone line along a test path, said test path including at least one voice switch test bus and a splitter;
  ascertaining in the background to DSL service on said telephone line a plurality of line characteristics of said telephone line along said test path using mid-band frequency signals and narrow-band frequency signals;
  analyzing said plurality of line characteristics to identify a plurality of line conditions which affect DSL service; and
  determining an impact level of one or more selected line conditions on DSL service.

2. The method of claim 1 wherein said test path is a single ended test path.

3. The method of claim 1 wherein said step of ascertaining said line characteristics is performed without disruption of ADSL service along said telephone line.

4. The method of claim 3 wherein said step of accessing said telephone line further comprises establishing direct communications between a loop test unit and said telephone line without the aid of a test access matrix (TAM).

5. The method of claim 1 wherein said line characteristics are selected from the group consisting essentially of: line length, line resistances, line conductances, line voltages, line impedance, and line continuity.

6. The method of claim 1 wherein said telephone line includes a pair of metallic lines and said line conditions include an imbalance condition between said pair of metallic lines.

7. The method of claim 6 wherein said imbalance condition is a resistive imbalance.

8. The method of claim 6 wherein said imbalance condition is a capacitive imbalance.

9. The method of claim 6 wherein said imbalance condition is a metallic fault.

10. The method of claim 6 wherein said line conditions are selected from the group consisting of Metallic Access Condition; Ringer Condition; Hazardous Volts Condition; Termination Condition; Cable Condition; Dispatch Condition; Signature Condition; and Line Imbalance Conditions.

11. The method of claim 1 wherein said DSL assessment is a DSL qualification determination for said telephone line.

12. The method of claim 1 wherein said DSL assessment is a DSL service assurance determination for said telephone line.

13. The method of claim 1 wherein mid band frequency signals includes frequencies signals between about 4 kHz and about 20 kHz.

14. The method of claim 1 wherein said DSL assessment is a periodic diagnostic of said subscriber's DSL service.

15. The method of claim 1 wherein said step of analyzing said line characteristics further includes determining noise characteristics and performance characteristics of said telephone line.

16. The method of claim 15 wherein said step of analyzing said line characteristics further includes estimating data transmission rates based on said noise characteristics of said telephone line.

17. The method of claim 15 wherein said step of analyzing said line characteristics further includes estimating data transmission rates based on said performance characteristics of said telephone line.

18. The method of claim 1 wherein said step of analyzing said line characteristics further includes estimating upstream data transmission rates of said telephone line.

19. The method of claim 18 wherein said step of determining the impact level further includes assessing the impacts of upstream data transmission rates along said telephone line on DSL service.

20. The method of claim 1 wherein said step of analyzing said line characteristics further includes estimating downstream data transmission rates of said telephone line.

21. The method of claim 20 wherein said step of determining the impact level further includes assessing the impacts of downstream data transmission rates on DSL service.

22. The method of claim 1 wherein said step of determining the impact further comprises assessing overall DSL service availability for said telephone line.

23. The method of claim 1 wherein said step of determining said impact level further includes classifying said impact level into one of at least three different levels.

24. A method for performing a test of DSL service comprising the steps of:
    accessing a telephone line along a test path that includes a splitter, said test path being a single ended test path;
    ascertaining in the background to DSL service on said telephone line a plurality of line characteristics along said test path using mid-band frequency signals and narrow-band frequency signals; and
    analyzing said plurality of line characteristics to identify a plurality of line conditions which affect DSL service.

25. The method of claim 24 wherein said step of ascertaining said line characteristics is performed without disruption of ADSL service along said telephone line.

26. The method of claim 25 wherein said step of accessing said telephone line further comprises establishing direct communications between a loop test unit and said telephone line without the aid of a test access matrix (TAM).

27. The method of claim 24 wherein said line characteristics are selected from the group consisting essentially of: line length, line resistances, line conductances, line voltages, line impedance, and line continuity.

28. The method of claim 24 wherein said telephone line includes a pair of metallic lines and said line conditions include an imbalance condition between said pair of metallic lines.

29. The method of claim 28 wherein said imbalance condition is a resistive imbalance.

30. The method of claim 28 wherein said imbalance condition is a capacitive imbalance.

31. The method of claim 28 wherein said imbalance condition is a metallic fault.

32. The method of claim 24 wherein mid band frequency signals includes frequencies signals between about 4 kHz and about 20 kHz.

33. The method of claim 24 wherein said step of analyzing said line characteristics further includes determining noise characteristics and performance characteristics of said telephone line.

34. The method of claim 33 wherein said step of analyzing said line characteristics further includes estimating data transmission rates based on said noise characteristics of said telephone line.

35. The method of claim 33 wherein said step of analyzing said line characteristics further includes estimating data transmission rates based on said performance characteristics of said telephone line.

36. The method of claim 1 wherein the narrow-band frequency signals include frequencies $\leqq 3.5$ kHz.

37. The method of claim 24 wherein the narrow-band frequency signals include frequencies $\leqq 3.5$ kHz.

* * * * *